W. I. STAAF.
WATER TRAP.
APPLICATION FILED JUNE 2, 1914.
1,193,940.
Patented Aug. 8, 1916.
2 SHEETS—SHEET 1.
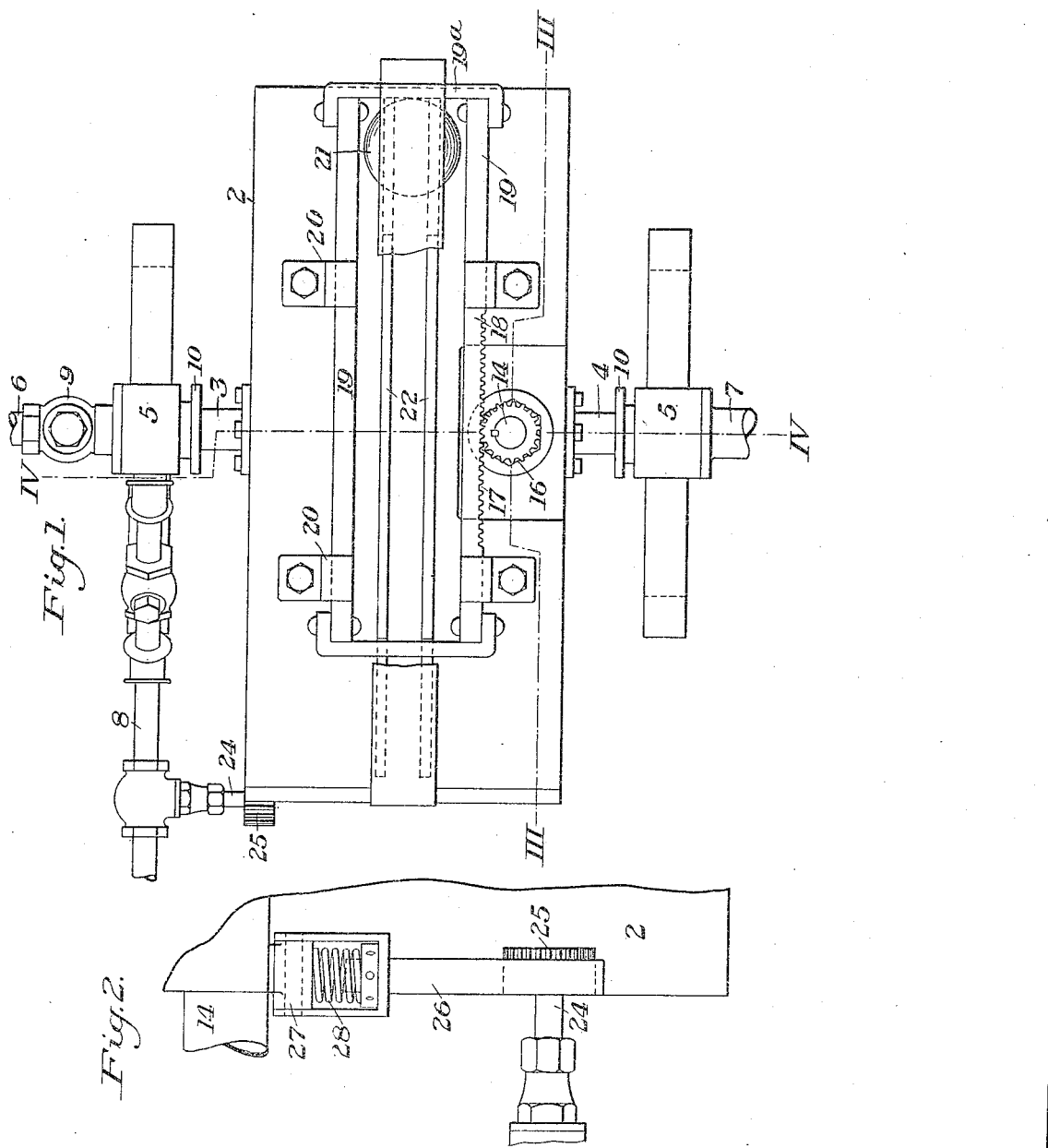
WITNESSES
R. A. Balderson
Geo. L. Robinson
INVENTOR
W. I. Staaf
by Bakewell, Byrnes & Parmelee
Attys.

W. I. STAAF.
WATER TRAP.
APPLICATION FILED JUNE 2, 1914.
1,193,940.
Patented Aug. 8, 1916.
2 SHEETS—SHEET 2.
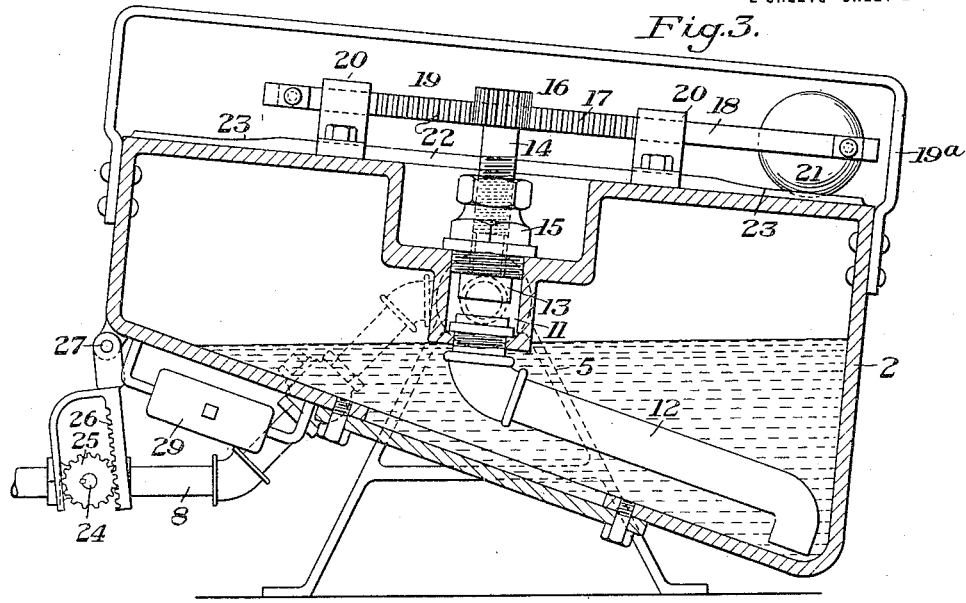
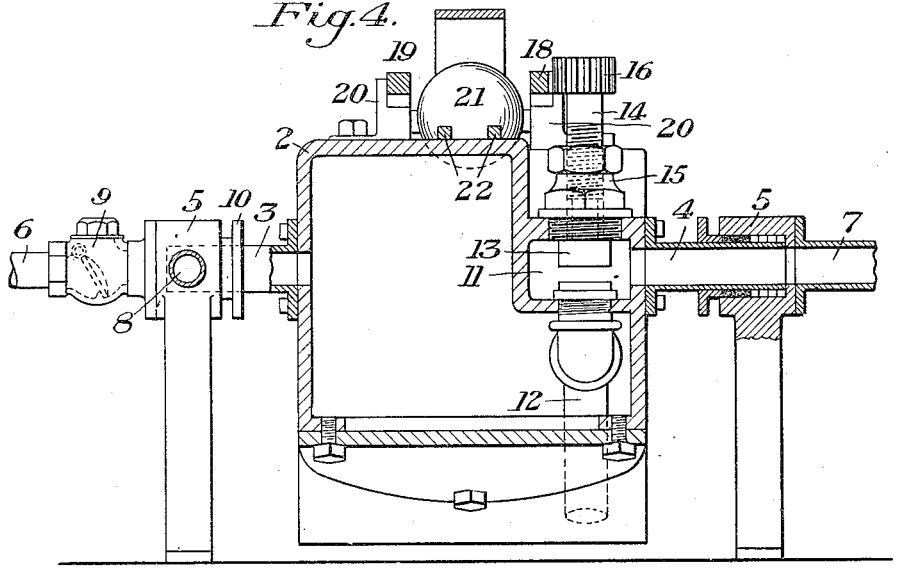
WITNESSES
R. A. Balderson
Geo. L. Robinson
INVENTOR
W. I. Staaf
by Bakewell, Byrnes & Parmelee
Attys.

UNITED STATES PATENT OFFICE.

WERNER I. STAAF, OF PITTSBURGH, PENNSYLVANIA, ASSIGNOR OF ONE-HALF TO EDWARD B. TYLER, OF PITTSBURGH, PENNSYLVANIA.

WATER-TRAP.

1,193,940.  Specification of Letters Patent.  Patented Aug. 8, 1916.

Application filed June 2, 1914. Serial No. 842,400.

*To all whom it may concern:*

Be it known that I, WERNER I. STAAF, a citizen of the United States, residing at Pittsburgh, in the county of Allegheny and State of Pennsylvania, have invented a new and useful Improvement in Water-Traps, of which the following is a full, clear, and exact description, reference being had to the accompanying drawings, forming part of this specification, in which—

Figure 1 is a plan view of a trap embodying my invention; Fig. 2 is a detail view of a portion of a trap and hereinafter more fully described; Fig. 3 is a longitudinal vertical section taken on the line III—III of Fig. 1; and Fig. 4 is a transverse vertical section taken on the line IV—IV of Fig. 1.

My invention has relation to water traps, and is designed to provide a simple and efficient form of trap in which the trapped water is discharged at intervals by the action of high pressure steam automatically admitted to the trap chamber or vessel.

My invention also provides automatic means of simple character for controlling the operation of the high pressure steam inlet valve and of the water-discharge valve.

Referring to the accompanying drawings, in which I have shown a preferred form of my invention, the numeral 2 designates a trap vessel which is of greater depth at one end than at the other, as indicated in Fig. 3. This trap vessel is pivotally supported by means of the hollow trunnions 3 and 4, the trunnion 3 forming an inlet connection for the steam and water to be trapped, while the trunnion 4 forms an outlet connection for the water. These trunnions are rotatably engaged with the chambered bearings 5, to which are respectively connected the inlet pipe 6 and the outlet and discharge pipe 7. Connection with a source of high pressure steam through a pipe 8 is also made within the chamber of the bearing 5 at the inlet side of the trap.

9 designates a check valve in the connection 6, for preventing any back flow of water from the trap out through this connection.

10 designates suitable stuffing boxes or packings, around the trunnions 3 and 4, where they enter the bearings 5.

Formed within the chamber of the trap vessel is a sub-chamber 11, into which the inner end of the hollow trunnion 4 opens, and from which leads a discharge pipe 12, extending into the bottom portion of the deeper end of the vessel. The upper end of the pipe 12 within the sub-chamber 11 forms a seat for a screw valve 13, carried by a rotatable stem 14, extending upwardly through the top of the box, and provided with a suitable stuffing box 15. The upper end of the stem 14 has fixed thereto a pinion 16, the teeth of which are engaged by teeth 17 on a rack bar 18. This rack bar 18 forms one member of the longitudinally movable frame 19, supported in suitable guides 20 on the top of the vessel 2.

21 designates a ball, which is mounted within the frame 19 (which acts as a guide therefor), and is arranged to roll upon the longitudinal tracks 22. The end portions of these tracks are preferably provided with the incline 23 (see Fig. 3).

The high pressure steam inlet pipe 8 has a control valve whose stem 24 carries a pinion 25, whose teeth are engaged by the teeth of a rack bar 26, pivotally connected to the trap vessel at 27. Preferably, this connection has a spring 28, interposed therein, as shown in Fig. 2, for the purpose of protecting the valve and its actuating gears against jars when the trap operates.

29 is a counterweight atached to the shallower end portion of the trap vessel.

The operation is as follows: Water entering the chamber of the trap vessel through the hollow trunnion 3, accumulates in such chamber until a level is reached which gives a sufficient weight of water in the deeper end of the vessel to overcome the counterbalance weight 29. The vessel then rocks or turns on its trunnion bearings to the position shown in Fig. 3. During this movement, the ball 21 which has been at the left hand end of the tracks 22 starts to roll toward the opposite end. This movement is gradual at first, owing to the incline 23. After the ball passes this incline, its movement is accelerated and it attains sufficient velocity so that its contact with the end bar 19ª of the frame 19 is sufficient to move said frame longitudinally, and thereby open the valve 13, which has been closed during the time that the water is accumulating in the trap chamber. This tilting movement of the trap vessel also actuates the rack bar 26 to open the valve in the high pressure steam inlet connection 8. Steam is now admitted to the trap chamber and acts to force the accumulated water out through the pipe 12, the sub-chamber 11 and the hollow trunnion 4, into the outlet pipe 7. When the water has been discharged, the counterweight 29 rocks the trap vessel to its initial position, the ball 21 rolls back on the tracks 22, and the discharge valve 13 and the valve in the high pressure steam inlet connection are closed.

The operations just described occur periodically and are entirely automatic. The valve arrangement is extremely simple and positive in its action. The connections in the bearings 5 between the trap vessel and the inlet and outlet pipes can readily be made and kept tight without danger of leakage at these points.

I do not desire to limit myself to the particular construction and arrangement of parts as herein shown and described, as it is obvious that they may be changed in various ways within the spirit and scope of the appended claims.

I claim:

1. A trap comprising a tiltable trap vessel, a ball runway mounted thereon, a discharge valve having a stem provided with a pinion, a longitudinally movable frame carrying rack teeth which engage the pinion, and a ball mounted on said runway and adapted to engage said frame at the limits of the travel of the ball to shift the said frame to thereby actuate the valve stem, substantially as described.

2. A trap comprising a tiltable trap vessel, having an inlet connection for the steam and water to be trapped, an outlet connection for the water, a valve normally closing said outlet, a connection for live steam, another valve which normally closes the live steam connection, toothed gears on the stems of the valves, and racks connected to the vessel and engaging said gears, together with a shiftable weight member mounted on the vessel and arranged to actuate the rack when shifted by the tilting movement of the vessel, substantially as described.

3. In a trap, the combination with a tiltable trap vessel, having a valved connection, of a frame mounted for independent endwise movement on the vessel, a gravity-actuated shiftable member mounted to move in said frame, and actuating connections between said frame and the stem of the valve, substantially as described.

4. In a trap, the combination with a tiltable trap vessel, having a valved connection, of a frame mounted for independent endwise movement on the vessel, a gravity-actuated shiftable member mounted to move in said frame, and actuating connections between said frame and the stem of the valve, together with means for retarding the movement of said member at the beginning of its travel, substantially as described.

In testimony whereof, I have hereunto set my hand.

W. I. STAAF.

Witnesses:
W. C. Lyon,
H. M. Corwin.

Copies of this patent may be obtained for five cents each, by addressing the "Commissioner of Patents, Washington, D. C."